Patented Nov. 2, 1948

2,452,968

UNITED STATES PATENT OFFICE 2,452,968

METHOD OF STABILIZING BEER AGAINST RADIATION DETERIORATION

Erwin C. Uihlein, Grafton, and James W. Lawrie, Milwaukee, Wis., assignors to Jos. Schlitz Brewing Company, Milwaukee, Wis., a corporation of Wisconsin No Drawing. Application March 11, 1946, Serial No. 653,702

8 Claims. (Cl. 99—48)

The invention relates to a beverage preserving method and container.

Beverages, such as beer, containng proteins, have been found to deteriorate in both light and darkness, even though confined in sealed containers.

The invention which will be described herein will be explained as applied to beer, but it may be applied to other beverages.

Beer contains in solution, proteins and other organic matter that gives it, as it is in its original state, a characteristic aroma, savor, clarity, and brilliance that is sought to be retained in storage and distribution until the beer is consumed.

Neither the opaque nor translucent containers have sufficed to attain the end sought in making the beer more lasting in retaining its original characteristic aroma, savor, clarity, and brilliance.

The present invention has for its object to provide a method and container which will prolong keeping the beer in its original state and retaining its original characteristic aroma, savor, clarity, and brilliance.

When beer is stored or distributed in either an opaque or a translucent container, its proteins and other organic components are subject to rapid deterioration both in darkness in the presence of air and in light in the presence or absence of air.

The light causes acceleration of the oxidation and agglomeration of the proteins in the beer.

The oxidation and agglomeration of the proteins in either light or darkness cause the beer to lose its original characteristic aroma, savor, clarity, and brilliance.

According to the present invention, the beer is confined in a light absorbing container through which long light waves of the order of above five thousand six hundred (5600) angstrom units are transmitted to the beer to reduce protein oxidation, and short light waves of the order of below five thousand six hundred (5600) angstrom units are excluded from the beer to reduce protein agglomeration.

The result is that the beer is preserved to make its original characteristic aroma, savor, clarity, and brilliance more lasting.

The exclusion of the short light waves of the order of below five thousand six hundred (5600) angstrom units precludes the formation in the beer of such mercaptans as give an offensive odor.

The container by which the aforesaid invention may be practiced may be made of a colored glass which will transmit the radiant energy of long light waves of the order of above five thousand six hundred (5600) angstrom units and substantially exclude the radiant energy of short light waves of the order of below five thousand six hundred (5600) angstrom units, a type of such colored glass being described in the following patents issued to Dobrovolny, et al.:

| Patent No. | Patent date |
|---|---|
| 2,174,554 | Oct. 3, 1939 |
| 2,233,343 | Feb. 25, 1941 |

The colored glass as described in said patents of Dobrovolny, contains copper compounds as a colorant and one or more substances of a group consisting of alkali metal cyanide, alkali metal cyanate, alkali metal cyanamide and bismuth, which glass inherently, as determined by actual tests, substantially excludes as stated above, light waves shorter than about 5,600 angstrom units. Further, said glass, inherently as determined by actual tests excludes a substantial proportion of the light waves longer than about 7,000 to 10,000 angstrom units with the result that the radiation transmitted by said glass of wave length between 5,600 angstrom units and about 7,000 to 10,000 angstrom units inherently and markedly preponderates over radiation of wave lengths both shorter and longer than that within this range. By actual tests it has been found that when beer is subjected to radiation markedly preponderating in wave lengths within the range stated an inherent improved stabilization of said beer results.

The container in which the beer or other beverage is stored and distributed and by which the method is practiced, may assume various forms, and may be made from various light absorbing mediums to transmit and exclude the light waves and radiant energy specified herein.

While the invention is set forth herein as applied to preserve beer, it may readily be applied and employed to preserve other products that are subject to rapid decomposition and deterioration by ambient light.

The foregoing invention having been thus described is hereby claimed as follows:

1. A beverage preserving method, consisting in confining a beverage containing proteins in a light absorbing vessel transmitting long light waves of an order above five thousand six hundred (5600) angstrom units to said beverage and excluding from said beverage by said vessel the approximate intensity of short light waves of an order below five thousand six hundred (5600)

angstrom units and to a substantial extent light waves of a wave length longer than about 7,000 to 10,000 angstrom units.

2. A beverage preserving method, consisting in subjecting a beverage containing proteins to long light waves of an order about five thousand six hundred (5600) angstrom units and excluding from said beverage the approximate entire intensity of short light waves of an order below five thousand six hundred (5600) angstrom units and to a substantial extent light waves of a wave length longer than about 7,000 to 10,000 angstrom units, and sealing said beverage from the ambient air.

3. A beverage container, comprising a light absorbing vessel confining a proteinaceous beverage, said vessel being composed of a substance capable of transmitting to said beverage light waves of an order above five thousand six hundred (5600) angstrom units and excluding from said beverage the approximate entire intensity of short light waves of an order below five thousand six hundred (5600) angstrom units and to a substantial extent light waves of a wave length longer than about 7,000 to 10,000 angstrom units, and a seal closing said vessel and sealing said container to exclude ambient air therefrom.

4. The herein described process for preserving a proteinaceous or other product from rapid decomposition and deterioration by ambient light, which consists in transmitting to the product through a light absorbing medium the approximate entire intensity of light waves in the spectrum band between the order of six thousand (6000) angstrom units and six thousand two hundred (6200) angstrom units, and excluding from said product by said medium the approximate entire intensity of light waves below the order of five thousand six hundred (5600) angstrom units and in part to a substantial extent the intensity of the light waves above the order of seven to ten thousand (7000 to 10,000) angstrom units.

5. A beverage container for preserving a proteinaceous or other product from rapid deterioration and decomposition by ambient light, comprising a vessel composed of a light absorbing medium transmitting the approximate entire intensity of light waves in the spectrum band between the order of six thousand (6000) angstrom units and six thousand two hundred (6200) angstrom units, and excluding from said product by said medium the approximate entire intensity of light waves below the order of five thousand six hundred (5600) angstrom units and in part to a substantial extent the intensity of the light waves above the order of seven to ten thousand (7000 to 10,000) angstrom units.

6. The process of stabilizing beer against radiation induced deterioration which consists in subjecting said beer to radiation transmitted through a substance which substantially excludes radiation of wave lengths shorter than about 5,600 angstrom units, excludes radiations in substantial part longer than about 10,000 angstrom units and which transmits a preponderance of wave lengths in the range from 5,600 angstrom units to 10,000 angstrom units.

7. The process of protecting beer against radiation induced deterioration which consists in enclosing said beer in a container composed of a substance which substantially excludes radiation of wave lengths shorter than about 5,600 angstrom units, excludes radiations in substantial part longer than about 10,000 angstrom units and which transmits a preponderance of wave lengths in the range from 5,600 angstrom units to 10,000 angstrom units.

8. The process of protecting beer against radiation induced deterioration which consists in enclosing said beer in a container composed of glass made from a glass batch containing a copper compound as a colorant, and one or more substances selected from the group consisting of alkali metal cyanides, cyanates and cyanamides, and bismuth; which glass substantially excludes radiation of wave lengths shorter than about 5,600 angstrom units, excludes radiations in substantial part longer than about 10,000 angstrom units, and which transmits a preponderance of wave lengths in the range from 5,600 angstrom units to 10,000 angstrom units.

ERWIN C. UIHLEIN.
JAMES W. LAWRIE.

REFERENCES CITED

The following references are of record in the file of this patent:

UNITED STATES PATENTS

| Number | Name | Date |
|---|---|---|
| 2,174,554 | Dobrovolny | Oct. 3, 1939 |
| 2,233,343 | Dobrovolny | Feb. 25, 1941 |

OTHER REFERENCES

Wallerstein Laboratories Communications, Wallerstein Laboratories, 180 Madison Ave., New York, N. Y., vol. IV, No. 11, April 1941, pages 4, 5, 29 to 40.

Certificate of Correction

Patent No. 2,452,968.  November 2, 1948.

ERWIN C. UIHLEIN ET AL.

It is hereby certified that error appears in the printed specification of the above numbered patent requiring correction as follows:

Column 2, line 54, claim 1, after the word "approximate" insert *entire*; and that the said Letters Patent should be read with this correction therein that the same may conform to the record of the case in the Patent Office.

Signed and sealed this 5th day of April, A. D. 1949.

[SEAL]

THOMAS F. MURPHY,
*Assistant Commissioner of Patents.*